United States Patent [19]

Pursell et al.

[11] Patent Number: 4,901,397
[45] Date of Patent: Feb. 20, 1990

[54] CARCASS SPREADER DEVICE

[76] Inventors: Mark S. Pursell, 302 New Jersey Ave.; Michael T. Pursell, 266 Bates St., both of Phillipsburg, N.J. 08865

[21] Appl. No.: 318,184

[22] Filed: Mar. 2, 1989

[51] Int. Cl.⁴ .............................................. A22C 15/00
[52] U.S. Cl. ......................................... 17/1 R; 17/44
[58] Field of Search ............................. 17/1 R, 23, 44

[56] References Cited

U.S. PATENT DOCUMENTS

| | | | |
|---|---|---|---|
| 544,858 | 8/1895 | Larson | 17/44 |
| 1,117,436 | 11/1914 | Person | 17/44 |
| 2,270,857 | 1/1942 | Demoss | 17/44 |
| 4,027,357 | 6/1977 | Morris | 17/44 |

FOREIGN PATENT DOCUMENTS

| | | | |
|---|---|---|---|
| 0027577 | 4/1921 | Denmark . | |
| 445898 | 3/1925 | Fed. Rep. of Germany | 17/44 |
| 560296 | 9/1932 | Fed. Rep. of Germany . | |

| | | | |
|---|---|---|---|
| 12873 | 3/1901 | United Kingdom | 17/44 |

Primary Examiner—Willis Little
Attorney, Agent, or Firm—Kenneth P. Glynn

[57] ABSTRACT

The present invention is directed to a portable, compact device for spreading a carcass for gutting and cleaning. The device has a pair of opposite, elongated arms with a top end and a bottom end. The two arms are rotatably connected near the top end via an axle or pin which enables the arms to be closed or opened. At the bottom end of each arm is a carcass engaging means, e.g. pointed ends. A spring located near the top ends but below the axle biases the arms in a closed position and may also act to bias the arms in a fully opened position during use. The arms also include holding means such as ridges or handles. The user cuts open a carcass and then inserts the carcass engaging means ends of the arms to the carcass which rotatably opening the arms.

12 Claims, 2 Drawing Sheets

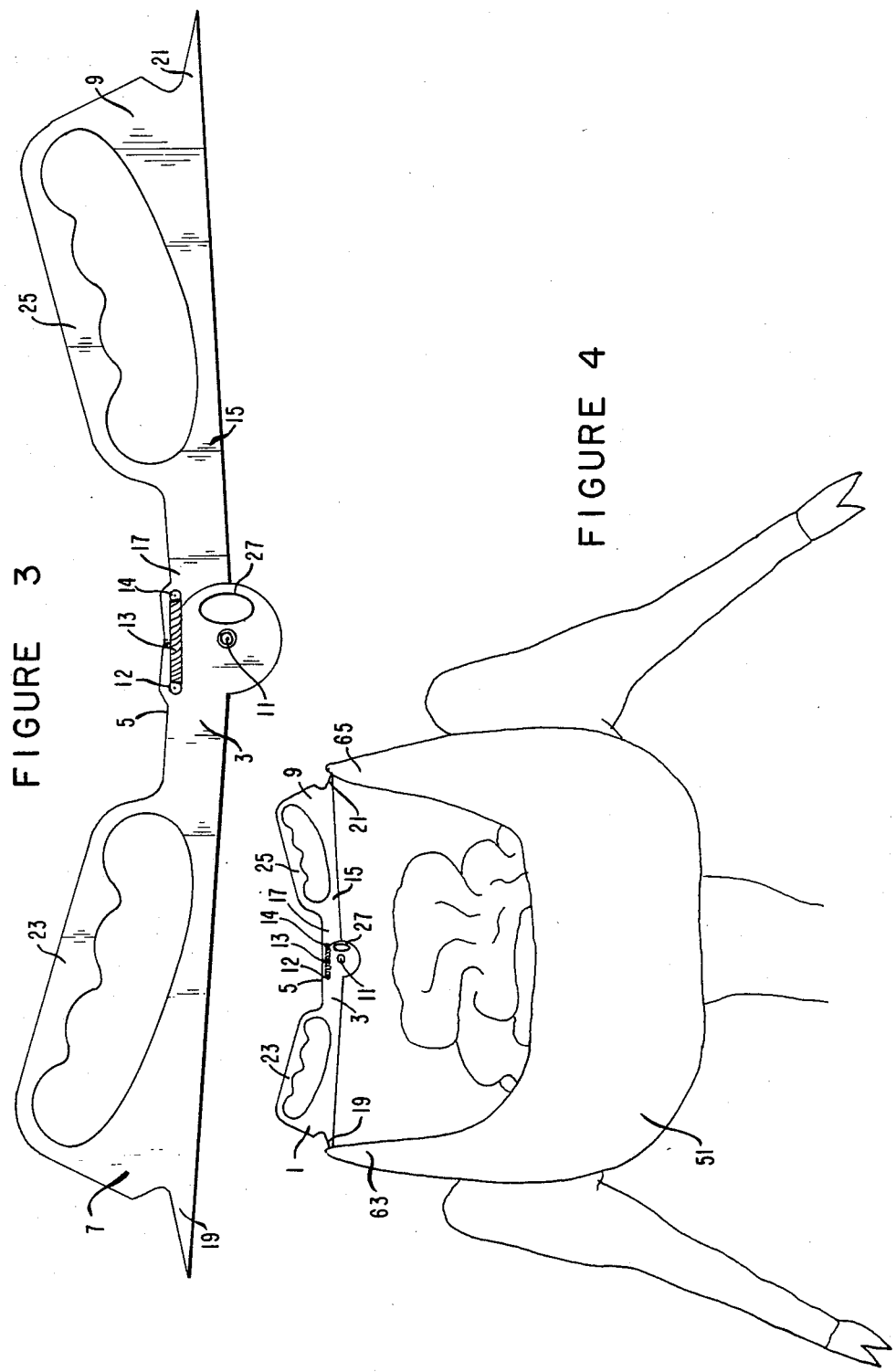

CARCASS SPREADER DEVICE

BACKGROUND OF THE INVENTION

1. Field of the Invention

The present invention is directed to a carcass spreader device and more particularly to a device which is both compact and portable. Thus, the present invention carcass spreader is intended to be used, for example, by hunters when gutting their catch in otherwise difficult areas for performing this task, e.g., in the middle of the woods prior to hauling the animal to a vehicle for transportation.

2. Prior Art Statement

The problem of working on animal carcasses has been recognized for hundreds of years and various types of devices have been developed to solve some of the problems inherent with the relative elasticity of a carcass and its physical desire to return to its closed shape as well as problems pertaining to working on a carcass before rigor mortis sets in making it significantly more difficult to work on the carcass.

Scanning the art, it is recognized that in 1895, a patent was issued to C. A. Larson for a gambrel, U.S. Pat. No. 544,858 which shows a rather complex device which has hinged arms from a gambrel and, for example, in FIG. 14 thereof, shows a device for spreading a carcass. However, this device involves bulky fabrication, at least three separate points of rotation and complex hinging. U.S. Pat. No. 1,117,436 to G. E. Person shows a rather complex device which is entitled a Butcher's Gambrel which has a series of four arms and perhaps five hooks as well as a central body member which is used to spread an animal for butchering. This device requires some kind of hoist or pulley and is designed for butcher shop use. U.S. Pat. No. 4,027,357 describes a collapsible dressing hook for animals but this device also includes a plurality of rotational points and a series of complex bars and hoisting mechanisms involving a hinged yoke.

Also noted is Patentschrift No. 40400 to Gottlieb Paul Schmidt in Eisenhuttenwerk Schmiedeberg for a device which may be used for spreading large animals. This device involves six or seven points of rotation and requires lifting for operation. Patentschrift No. 560,296 shows some kind of carcass spreading device but this works in a single plane and must be rotated while being held in position at the carcass to function. Dansk Patent No. 27,577 is directed to a device for holding a carcass open when butchering and this device involves the use of a handle which must be held by two hands to be properly balanced as well as cylinders from which carcass engaging means apparently rotate outwardly. Thus, this device requires complex steps involving rotation of the engaging means one at a time and then two handed downward motion to engage and have the spreader operate.

Notwithstanding the recognized prior art described above, the present invention enables the user to single-handedly spread the carcass of a deer, small bear or other animal at the site of the kill so as to permit the user to immediately remove the guts of the animal before rigor mortis sets in and so as to enable the gutting to be much easier to perform and so as to make the animal much lighter to carry back for transporting to be subsequently butchered. Further, the present invention device is apparently the only device which has a single point of rotation without any other moving parts involved.

SUMMARY OF THE INVENTION

The present invention is directed to a portable, compact device for spreading a carcass for gutting and cleaning. The device has a pair of opposite, elongated arms with a top end and a bottom end. The two arms are rotatably connected near the top end via an axle or pin which enables the arms to be closed or opened. At the bottom end of each arm is a carcass engaging means, e.g. pointed ends. A spring located near the top ends but below the axle biases the arms in a closed position and may also act to bias the arms in a fully opened position during use. The arms also include holding means such as ridges or handles. The user cuts open a carcass and then inserts the carcass engaging means ends of the arms to the carcass which rotatably opening the arms.

BRIEF DESCRIPTION OF THE DRAWINGS

The present invention is more fully understood when the specification herein is taken in conjunction with the attached drawings wherein:

FIG. 3 shows the device of FIG. 1 in a opened position; and,

FIG. 4 shows a present invention device being initially engaged on the sides of an opening in a carcass.

DETAILED DESCRIPTION OF THE INVENTION AND DRAWINGS

As mentioned above, the present invention has been developed to enable the hunter or other user to clean and gut an animal in a convenient and efficient fashion at the site of the kill. Before the present invention was developed, hunters would typically make an incision in the stomach area of the slain animal to gut and clean it prior to rigor mortis settling in and prior to removing same for transportation. Previously, after the incision is made, it is extremely difficult given the weight of an animal such as a deer or elk to keep the incision open and at the same time use the hands to remove the internal aspects of the animal. This requires some strength and the tendency is for the opening to close up based on the weight of the animal and the particular shape. Hunters sometimes use sticks or work together to keep the incision open widely to facilitate the removal of the guts of the animal and the present invention enable a single user to achieve even better results. More specifically, the present invention device is compact and portable and may be carried, for example, on a belt or otherwise in a convenient carrying position and opened up and used as may be required. The device has carcass engaging mechanisms at the bottom end of two arms which rotate or pivot about a central axle. The arms have holding means such as grooves, ridges or handles to create ease in operating the device. The carcass spreader of the present invention is simply used by locating the carcass engaging mechanisms or means on either side of an incision and swinging the arms outwardly while pushing to spread the carcass and to create a wide opening so as to enable the user to have two hands available for the gutting process.

Figure 1:
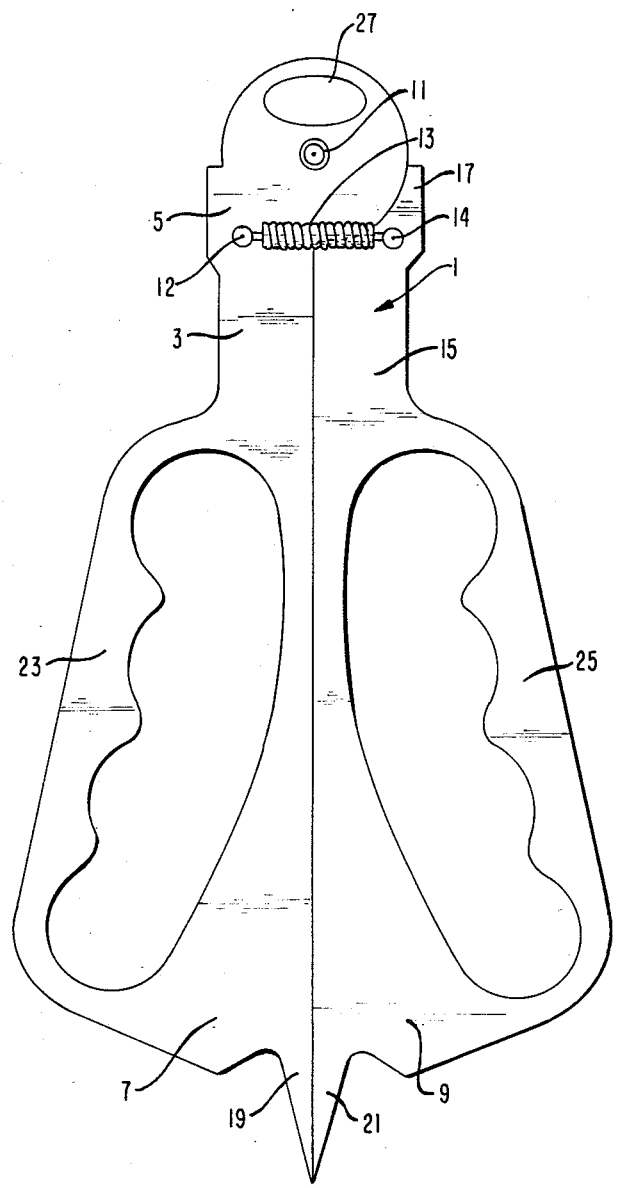
FIG. 1 shows an embodiment of the present invention device in the fully closed position.
Figure 2:
FIG. 2 shows a side view of the present invention device shown in FIG. 1.

Referring now to FIGS. 1 and 2 and especially FIG. 1, there is shown a carcass spreading device 1 which includes a left, elongated arm 3 having an upper or top end 5 with and a bottom end 7. Top end 5 includes a pivot point which in this case is a screw type axle 11, as well as one end 12 of spring 13 attached thereto. Opposite (right) elongated arm 15 is connected via axle 11 at its top end 17 to elongated arm 3. Arms 3 and 17 each have holding means e.g. handles 23 and 25, as shown. Arms 3 and 17 also have carcass engaging means 19 and 21, at bottom ends 7 and 9 respectively. These carcass engaging means or mechanisms 19 and 21 are simply sharp points, but may be pointed hooks or clamps, as long as they act to grasp or push into edges of a cut carcass to enable carcass spreading. Note that spring 13 is connected to arm 15 at spring end 14, thereby keeping the two arms biased in a closed position. Also, optional eyelet 27 may be used for belt attachment or the like.

FIG. 3 shows the device 1 in a fully open position. Like parts have like numbers corresponding to FIGS. 1 and 2. The device 1 would typically open to more than 180° and possibly 190° or 200° or even more, so that spring 13 would bias it so that it stays closed but when opened to an angle greater than 180°, the spring 13 biases the arms into the open position, much like a jack-knife or other spring loaded device. Spring 13 could be a bar spring or coil or equivalent and still fall within the meaning of a "spring" as used herein.

Referring now to FIG. 4 there is shown a slain deer 51 with a device 1 of the present invention in the fully opened position. The device includes the same features and parts as described above in conjunction with FIGS. 1, 2, and 3, when handles 23 and 25 are opened with carcass engaging means 19 and 21 piecing carcass portions, the carcass sides 63 and 65 respectively are opened to enable one to gut the animal as shown. Further, the present invention is used as a saftey device and when the spreader is in the carcass it enables the user to see what parts of the animal he is cutting and thereby avoids serious injury. Thus, the user is not cutting "in the dark" and exposed to unseen sharp implements.

Obviously, numerous modifications and variations of the present invention are possible in light of the above teachings. It is therefore understood that within the scope of the appended claims, the invention may be practiced otherwise than as specifically described herein.

What is claimed is:

1. A portable compact device for spreading a carcass for cleaning, which comprises:
   (a) a pair of opposite, elongated arms each having a top end and a bottom end, each being rotatably connected to one another about an axle near the top end, each having holding means located towards the bottom end and each having carcass engaging means at the bottom end, wherein said pair of elongated arms may be brought together in parallel so as to be closed when not in use and may be spread apart rotatably by affixing the carcass engaging means of each arm to an open carcass while lifting the handles upwardly and pivotally away from one another;
   (b) a spring which is connected to said elongated arms at an area towards the top end but below the axle so as to bias the elongated arms in the closed position when not in use and in an open position when spreading a carcass; and,
   (c) a rotational axle located near the top end of said elongated arms establishing a pivot point perpendicular to the length of said elongated arms.

2. The device of claim 1 wherein said pair of elongated arms are rigid plastic.

3. The device of claim 1 wherein said pair of elongated arms are solid metal.

4. The device of claim 1 wherein said pair of elongated arms have no moving parts except for the rotation about said rotational axle.

5. The device of claim 1 wherein said holding means is a handle which is integrally formed into each of said elongated arms.

6. The device of claim 1 further comprising a stop mechanism located on at least one of said elongated arms to prevent the elongated arms from opening to an angle in excess of 190°.

7. The device of claim 2 further comprising a stop mechanism located on at least one of said elongated arms to prevent the elongated arms from opening to an angle in excess of 190°.

8. The device of claim 3 further comprising a stop mechanism located on at least one of said elongated arms to prevent the elongated arms from opening to an angle in excess of 190°.

9. The device of claim 4 further comprising a stop mechanism located on at least one of said elongated arms to prevent the elongated arms from opening to an angle in excess of 190°.

10. The device of claim 5 further comprising a stop mechanism located on at least one of said elongated arms to prevent the elongated arms from opening to an angle in excess of 190°.

11. The device of claim 6 wherein said stop mechanism and said spring lock the arms in the open position when fully opened.

12. The device of claim 7 wherein said stop mechanism and said spring lock the arms in the open position when fully opened.

* * * * *